(12) United States Patent
Watanabe (10) Patent No.: US 6,236,386 B1
(45) Date of Patent: May 22, 2001

(54) LIQUID CRYSTAL DISPLAY APPARATUS WITH TOUCH PANEL (75) Inventor: Mitsuhiro Watanabe, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/217,343

(22) Filed: Dec. 21, 1998

(30) Foreign Application Priority Data

Dec. 22, 1997 (JP) .................................................... 9-352873

(51) Int. Cl.[7] .................................................... G09G 3/36
(52) U.S. Cl. ........................ 345/98; 345/99; 345/100; 345/104; 345/179; 345/173
(58) Field of Search ........................ 345/99, 100, 179, 345/104, 98, 173

(56) References Cited

FOREIGN PATENT DOCUMENTS

| 4-15723 | 1/1992 | (JP) . |
|---|---|---|
| 4-371916 | 12/1992 | (JP) . |
| 5-6153 | 1/1993 | (JP) . |
| 6-161658 | 6/1994 | (JP) . |
| 6-187082 | 7/1994 | (JP) . |
| 6-318137 | 11/1994 | (JP) . |
| 9-128146 | 5/1997 | (JP) . |
| 63304313 | 12/1998 | (JP) . |

Primary Examiner—Richard Hjerpe
Assistant Examiner—Ali A. Zamani
(74) Attorney, Agent, or Firm—Ostrolenk, Faber, Gerb & Soffen, LLP

(57) ABSTRACT

In a liquid crystal display apparatus, sampling of an A-D converter for the purpose of capturing data from a touch panel is performed at a rate that is unrelated to the AC signal applied to the LCD, and data from the touch panel is captured in a regular manner in accordance with the sampling rate of the A-D converter. An added circuit detects the transformation points of the LCD AC signal and, based on a transformation point detection signal that is output by this circuit, data of the touch panel data sampled by the A-D converter that is affected by LCD noise is discarded, so that only data not affected by LCD noise is sent to a main memory.

10 Claims, 10 Drawing Sheets

LIQUID CRYSTAL DISPLAY APPARATUS WITH TOUCH PANEL

BACKGROUND OF THE INVENTION

1. Field of the Invention

The present invention relates to a touch panel circuit, and more particularly to a noise-elimination circuit of a touch panel.

2. Background of the Invention

In portable terminals using pen input on a touch panel in the past, an LCD (liquid crystal display) was used as the means for displaying information, and a touch panel was used as a means for inputting the required, characters, images, and other information.

A touch panel is usually laid over the LCD, with information often input in relationship to an image that is displayed on the LCD via an interface.

In a portable terminal, because of the tradeoff between cost and power consumption, a reflective type of STN (super twisted nematic) LCD is often used.

Because of the nature of this STN-type LCD, if the voltage polarity is fixed, the liquid crystal element exhibits deterioration and, for this reason, in actual use alternating current is applied to the LCD to inhibit such deterioration.

To achieve this, a signal that is made an AC signal is applied to the liquid crystal, so that the alignment thereof is changed periodically, so that the alignment of the LCD does not become fixed. When this AC signal changes, however, electromagnetic noise is generated from the LCD.

With a resistive film type of touch panel, a resistance value changes linearly, in response to the position that is touched. Using this characteristic and the principle of a resistive voltage divider, a voltage is applied to the X axis in order to read the position on the Y axis, the Y axis coordinate being read by the ratio of detected voltage between the Y terminals.

Similarly, a voltage is applied to the Y axis in order to read the position on the X axis, the X axis coordinate being read by the ratio of detected voltage between the X terminals.

This method is used to detect the coordinates of a position that is touched on a touch panel.

To obtain data from a touch panel, an A-D (analog-digital) converter is used. However, because of the high impedance of the A-D converter, the touch panel is relatively susceptible to the influence from electromagnetic noise that intrudes from outside.

Thus, if electromagnetic noise that is generated from the LCD is applied to the touch panel, an error occurs in the detected voltage, thereby preventing accurate acquisition of coordinate data.

In the past, the following known methods existed for avoiding the influence of the above-noted noise. For example, a transparent conductive sheet that is connected to the ground of the touch panel circuit was inserted between the LCD and the touch panel, so as to electrically reduce the noise generated from the LCD.

This method shall be referred to as the first example of prior art. Another method was based on the knowledge that there is a large amount of noise that is generated from the LCD at the transformation point of the AC signal applied for the purpose of changing the alignment of the LCD.

In this method, which will be referred to as the second example of prior art, the transformation point of the AC signal is detected, and the capture of data of the touch panel is stopped at this AC signal transformation point.

An additional method, referred to herein as the third example of prior art, is disclosed in the Japanese Unexamined Patent Publication (KOKAI) No. 4-15723.

In this example of prior art, the conductivity an ITO (indium tin oxide) film that is part of the touch panel is made small. That is, the problem of susceptibility to external noise caused by a high impedance is resolved by making the impedance between the ITO films low.

A fourth example of prior art is disclosed in the Japanese Unexamined Patent Publication (KOKAI) No. 4-371916.

In this example, to avoid the influence on a touch panel that is formed together with the LCD panel by noise from the LCD panel, the LCD AC signal is captured and a delay circuit is used to delay it by a prescribed amount of time. A single-pulse scan signal is generated at the rising edge of the delay signal that is output by the delay circuit.

Additionally, by capturing data from the touch panel in synchronization with this scan signal, there is a substantial elimination of noise from the touch panel.

In an additional fifth prior art example, which is disclosed in the Japanese Unexamined Patent Publication (KOKAI) No. 5-6153, a dummy electrode in proximity to the touch panel is used to pick up noise from the LCD. The difference between this signal from this dummy electrode and the touch panel signal is taken as the actual touch panel signal so as to substantially eliminate the noise on the touch panel.

The above-noted prior art methods, however, have the following problems. In the first prior art example, in order to electrically reduce the LCD noise, a transparent electrically conductive sheet is fitted between the touch panel and the LCD, thereby providing an electrical shield.

With this construction, however, even though the sheet is transparent, inserting the electrically conductive sheet LCD reduces the LCD contrast, and in actual use the LCD display becomes difficult to view, making this method impractical.

In the second prior art example, the capture of data is stopped at the transformation point of the AC signal. In this second prior art example, it is necessary to have a means of stopping midway the operation of the A-D converter that detects the position on the touch panel.

By stopping the operation of the A-D converter midway, an extra time lag occurs, thereby creating a substantial drop in the sampling rate of the A-D converter. As a result, there is a possibility of a loss of performance.

In the third prior art example, a low-resistance material is used for the material of the ITO film, thereby lowering the overall touch panel impedance so as to reduce the influence from external noise.

In the third prior art example, however, because a low-resistance material is used in the ITO film of the touch panel, when a voltage is applied in order to detect a position, a large amount of current flows between the terminals, this resulting in a large power consumption.

In the fourth prior art example, the LCD AC signal is captured and this AC signal is delayed by a prescribed amount of time, the delayed signal being use to trigger the A-D converter. In this case, the touch panel data capture timing is basically dependent upon the LCD AC signal.

If the touch panel data capture timing is dependent upon the LCD AC signal, however, the following problem occurs.

If the frequency of the AC signal is lower than the sampling frequency of the A-D converter that captures the touch panel data, sampling is performed each time the sampling start trigger is generated by the AC signal, this meaning that the number of samples taken is reduced, so that it is not possible capture meaningful data from the touch panel.

Also, even if data for several points are captured each time the sampling start trigger is generated by the AC signal, unless there is synchronization between the sampling rate and the AC signal frequency, non-uniform sampling will result.

In the fifth prior art example, a dummy electrode is used in order to eliminate noise generated by the LCD.

In this fifth prior art example, because of the use of a dummy electrode to eliminate noise on the touch panel, the cost is high compared to the case in which a dummy electrode is not used.

Also, when fitting the dummy electrode between the touch panel and the LCD, there is the problem of a loss of contrast in the LCD, similar to the case of the first prior art example.

Accordingly, it is an object of the present invention to provide a liquid crystal display accompanied by a touch panel directly attached thereto or with a touch panel provided closely adjacent thereto, which is capable of achieving a touch panel sampling rate that is not dependent upon the AC signal frequency, and of eliminating adverse affect to an image display caused by noise generated by the LCD and added to data used in the touch panel.

SUMMARY OF THE INVENTION

In order to achieve the above-noted objects, the present invention adopts the following basic constitution.

Specifically, a first aspect of the present invention is a liquid crystal display apparatus that includes an LCD as a display means, an LCD control unit that performs control of a display of said LCD, a main controller for the purpose of displaying required graphic data and character data on said LCD via the LCD control unit, an analog-type touch panel as an input means, an A-D converter that converts touch panel analog data to digital data, a touch panel interface for the purpose of establishing an interface between said main controller and said A-D converter, and in said display apparatus, information for a position on a screen being determined from said analog data of said touch panel, and said position information being displayed on said LCD, or used to detect a data input position corresponding to a position on said LCD screen, and wherein said display apparatus is further provided with a data-cancellation means for the purpose of inhibiting the capture of digital data from said A-D converter at a timing of the occurrence of noise that is generated as a result of a control signal that is supplied to said LCD from said LCD control unit.

A second aspect of the present invention is a liquid crystal display apparatus that includes an LCD as a display means, an LCD control unit that performs control of a display of said LCD, a main controller for the purpose of displaying required graphic data and character data on said LCD via the LCD control unit, an analog-type touch panel as an input means, a touch panel interface, which internally includes an A-D converter that converts touch panel analog data to digital data, for the purpose of establishing an interface between said main controller and said touch panel, and in said display apparatus, information for a position on a screen being determined from said analog data of said touch panel, and said position information being displayed on said LCD, or used to establish a correspondence to an input position on said LCD screen, and a data-cancellation means for the purpose of inhibiting the capture of digital data from said A-D converter at a timing of the occurrence of noise that is generated as a result of a control signal that is supplied to said LCD from said LCD control unit.

In both of the above-noted aspects of the present invention, the data-cancellation means includes a transformation point detection unit for the purpose of detecting the transformation point of an AC signal of the above-noted control signals and outputting a transformation point signal, a data capturing start signal generation unit that generates a data capturing start signal that establishes the capture timing of digital data from the A-D converter, and a captured data discarding unit that signal which receives the above-noted transformation point signal and data capturing start signal and that generates a data discard signal when at least a part of these signals temporally and mutually overlap to each other.

The above-noted data-cancellation means is provided in the touch panel interface, and the touch panel interface discards digital data captured from the A-D converter as an incorrect data to be displayed when the data discard signal is generated.

The transformation point detection unit includes a first clock generation circuit for the purpose of generating a first clock (A) in synchronization with the above-noted AC signal, a D-type flip-flop for the purpose of delaying, using the first clock(A), the AC signal by one clock, and an exclusive-OR circuit which takes the exclusive-OR of the original AC signal and the AC signal that is delayed by one clock and which outputs the result as a transformation point detection signal.

The captured data discarding unit includes a second clock generation circuit for the purpose of generating a second clock(B), an inverter circuit for the purpose of inverting the second clock, a first D-type flip-flop that receives the inverted second clock(B) at a clock terminal and receives the AC signal at a D input terminal, a second D-type flip-flop that receives the second clock(B) at a clock terminal and receives a Q output of the first D-type flip-flop at a D input terminal, and a logical AND circuit that takes the logical AND of the data capturing start signal and the Q output of the second D-type flip-flop and outputs the result as a data discard signal.

In the case in which the LCD has a function that generates an AC signal from the above-noted AC signal by means of a frame signal, the data-cancellation means includes a transformation point detection unit that detects the transformation point of the frame signal and outputs a transformation point detection signal, a data capturing start signal generation unit that generates a data capturing start signal that establishes the capture timing of digital data from the A-D converter, and a captured data discarding unit that receives the transformation point detection signal and data capturing start signal and generates a data discard signal when these signals temporally overlap.

By means of the above-noted constitution, parts of data that occur, when the timing of the transformation point of the AC signal and the timing of the data capturing operation overlap, are discarded, so that such incorrect data including such noise therein is not passed to the main controller.

As a result, even if electromagnetic noise occurs as a result of the LCD, there is no affect on the coordinate data for the touch panel. Also, because the sampling timing of the touch panel is not dependent upon the changes in the timing of the AC signal, it is possible to freely set the sampling rate.

DETAILED DESCRIPTION OF THE PREFERRED EMBODIMENTS

Preferred embodiments of the present invention are described in detail below, with reference made to relevant accompanying drawings.

Figure 1:
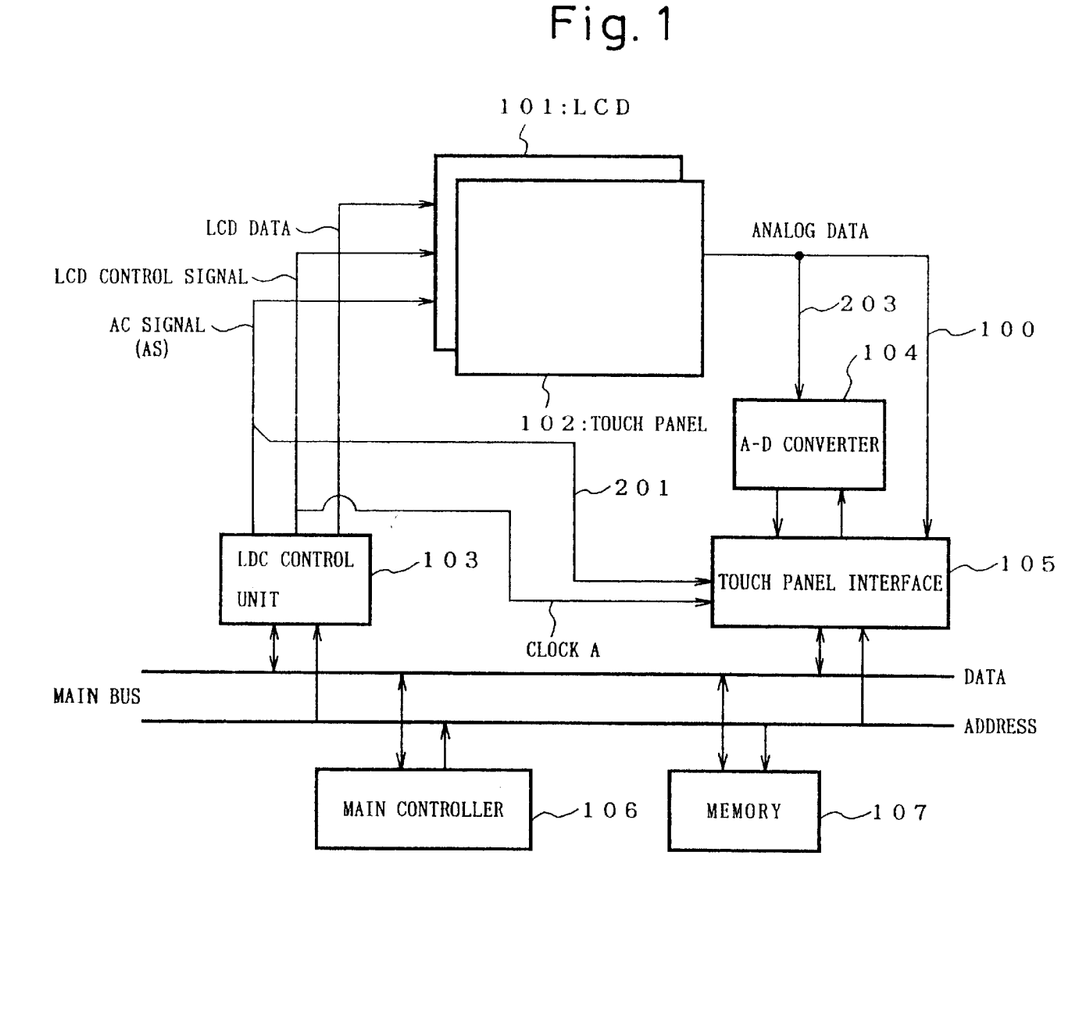
FIG. 1 is a block diagram that shows the configuration of a liquid crystal display apparatus to which the first embodiment of the present invention is applied.

Referring first to FIG. 1, the first embodiment of the present invention is a liquid crystal display apparatus formed by an LCD 101, a touch panel 102, an LCD control unit 103, an A-D converter 104, a touch panel interface 105, a main controller 106, and a memory 107.

The LCD 101 is connected to the LCD control unit 103, and the display thereof is controlled by the LCD control unit 103.

The LCD control unit 103 is connected to the main controller 106 via a main bus, which includes an address line and a data line.

The LCD control unit 103 converts LCD display data that is generated by the main controller 106 to data that is required for the LCD 101 to display this data, and sends data in accordance with the data capture timing of the LCD 101.

The LCD 101 is the unit which performs the actual display in the liquid crystal display apparatus. The LCD 101 displays data such as graphic data and character data that is generated by the main controller 106 and which is converted to match the LCD 101 interface by the LCD control unit 103.

The touch panel 102 is an input means, and is the unit which performs input of information external to the liquid crystal display apparatus.

In the case of an analog resistance-type touch panel, when the touch panel 102 is touched, the position information for the point that is touched is converted to a resistance value and output.

In actual use, a voltage is applied to the touch panel 102, and a voltage that is divided by the resistance thereof is read in both X axis and Y axis, respectively, so as to obtain position information on the touch panel.

This position information is the representation of coordinate data as an analog voltage that is proportional to a resistance value.

The A-D converter 104 receives an analog voltage as a touch panel signal 203 from the touch panel 102 that is proportional to the resistance value as the coordinate data and simultaneously receives an A/D signal conversion starting signal 100 which is generated from the touch panel and starts the function of the touch panel interface 105.

The A-D converter 104 converts this coordinate data to a form that can be processed by the CPU (central processing unit) of the main controller 106.

The touch panel interface 105 converts the coordinate data that is converted to digital values by the A-D converter to a format that can be accepted by the main controller 106, and passes this converted data to the main controller 106.

The touch panel interface 105 also serves to detect the transformation point of the AC signal (AS) of the LCD control unit 103, and to discard position information on the touch panel 102 that is captured at a transformation point of the AC signal(AS), this being the coordinate data after A-D conversion.

The main controller 106 is formed by a CPU and an interface circuit.

This interface circuit is provided as an interface to peripheral circuits such as the memory 107 and the LCD control unit 103.

The CPU of the main controller 106 is a unit that performs various calculations. One processing function that is performed by the main controller 106 is that of converting coordinate data after capturing from the touch panel 102 and A-D conversion to coordinate data that corresponds to positions on the screen of the LCD 102.

The memory 107 is used to perform such functions as storing a program for the CPU of the main controller 106, and storing temporary data that is required for operation of the CPU program.

The memory 107 can also at times be used as an area for storage of data that is to be displayed on the LCD 101.

Figure 2:
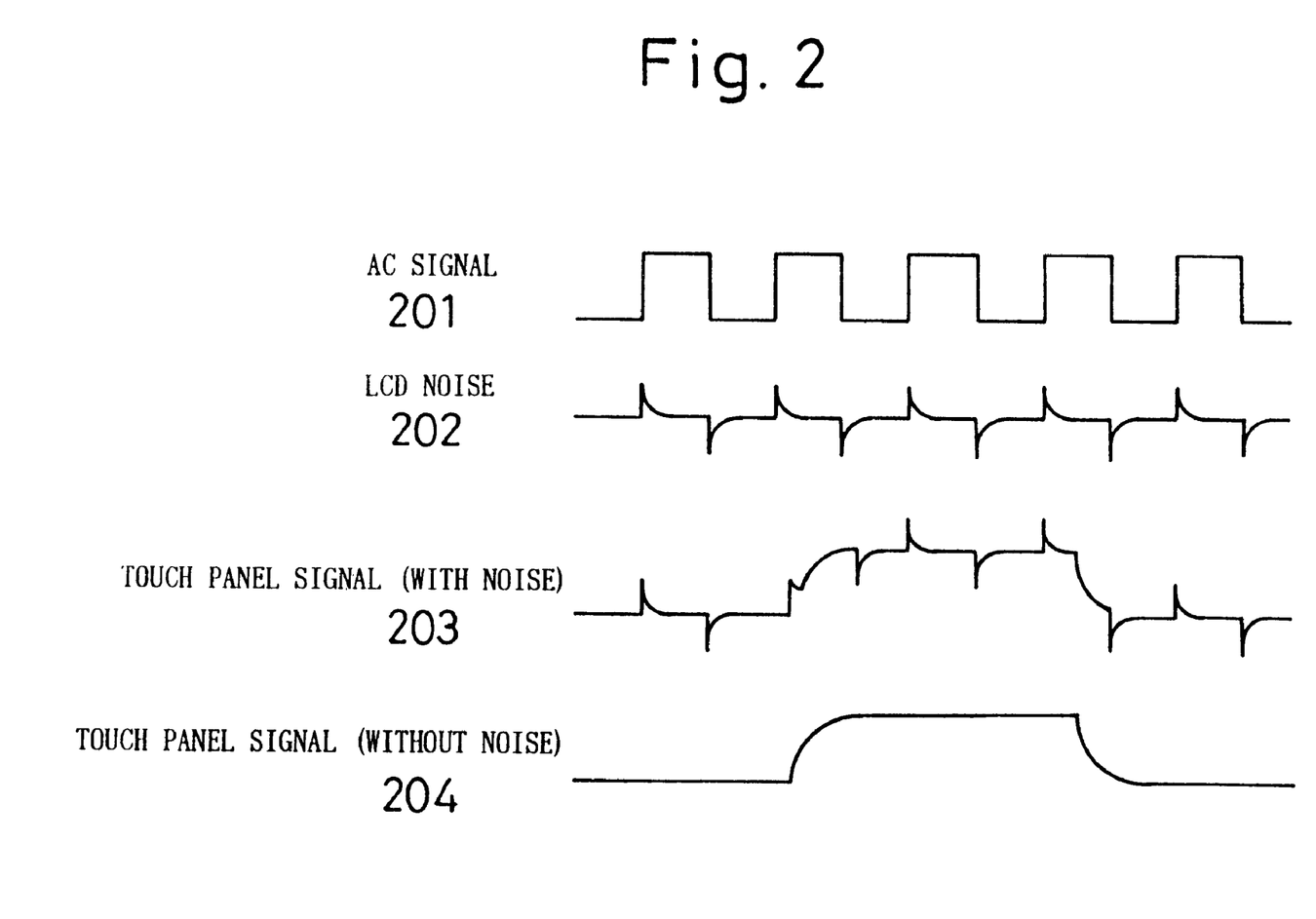
FIG. 2 is a waveform diagram that illustrates the affect of LCD noise on the touch panel signal in the configuration that is shown in FIG. 1.

Referring to FIG. 2, the affect of noise caused by the AC signal(AS) supplied to the LCD 101 on the analog data of the touch panel will be described next.

In FIG. 2, the AC signal(AS) as shown as 201 in FIG. 2, is a signal for the purpose of changing the polarity of the LCD 101.

At the rising and the falling edges of the AC signal 201, the polarity of the liquid crystal element changes, at which point the LCD noise 202 occurs at the LCD 101.

The no-noise touch panel signal 204 is the signal at the touch panel 102 before the introduction of the LCD noise 202.

When the LCD noise 202 is superimposed on this no-noise touch panel signal 204, the resulting waveform is as shown as the noisy touch panel signal 203 in FIG. 2.

For this reason, when performing A-D conversion of the analog data from the touch panel 102, at the point at which analog data from the touch panel is captured, there is a possibility that erroneous touch panel analog data, onto which the LCD noise 202 is superimposed will be captured.

Figure 3:
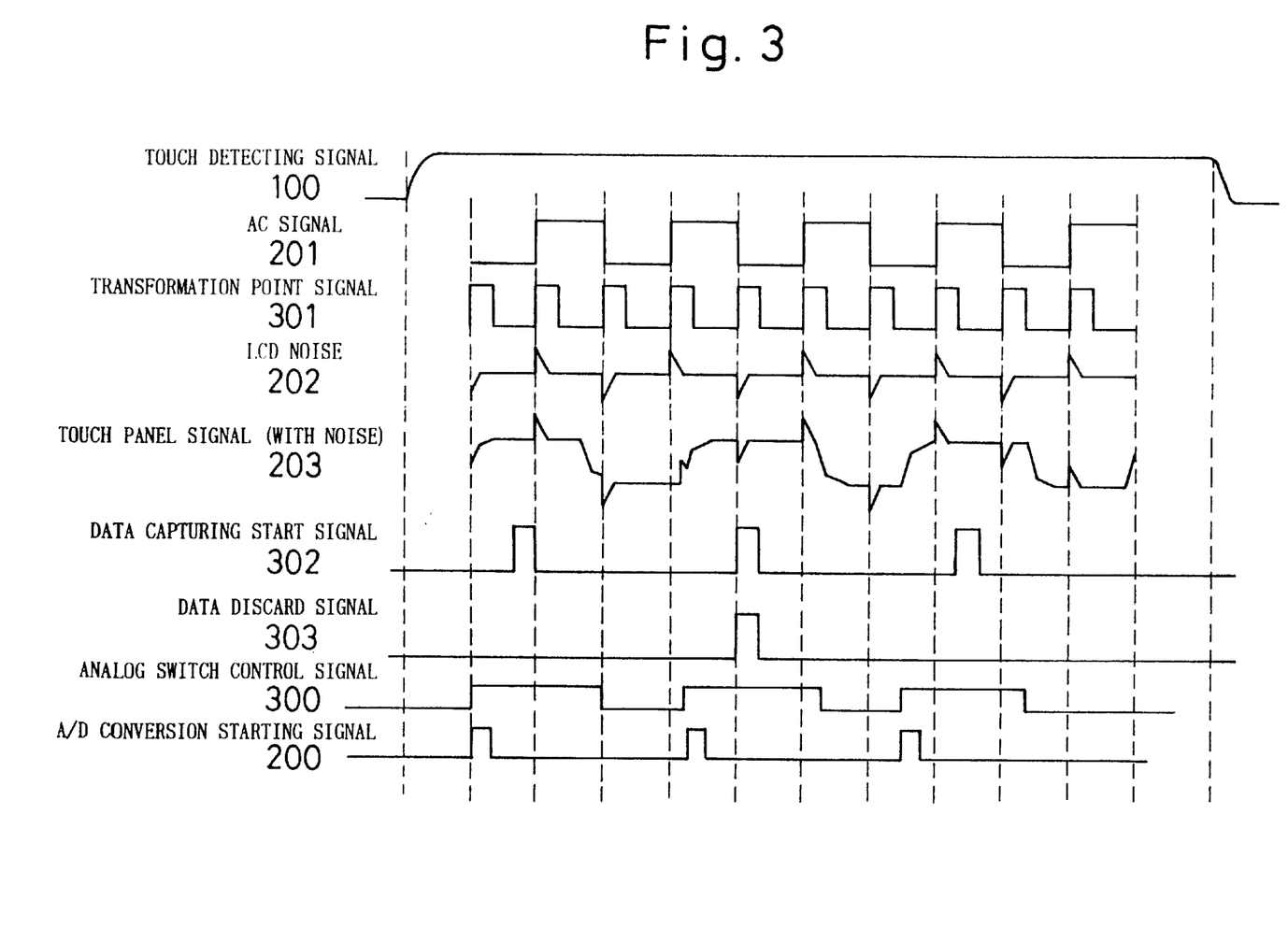
FIG. 3 is a waveform diagram that illustrates the relationship between the transformation point detection signal obtained from the AC signal, the data capturing start signal, and the data discard signal.

FIG. 3 shows the timing of the AC signal 201 and the data discard signal 303 which is used for canceling the data of touch panel signal 203 including such noise therein by not capturing same into the A-D converter 104.

From the AC signal 201 provided to change the polarity of the LCD 101, the transformation point detection signal 301, which indicates the rising and falling points of the AC signal 201 is generated.

Then, a point at which this transformation point detection signal 301 coincides with the data capturing start signal 302 that indicates the timing of the capturing of analog data from the touch panel 102, is taken as the timing for the generation of a data discard signal 303.

Note that FIG. 3 also shows the LCD noise signal 202 and the noisy touch panel signal 203 that are shown in FIG. 2.

With regard to the data capturing start signal 302, while there is the method of generating this in synchronization with the AC signal 201, this embodiment is based on the approach of performing capturing the analog data in a manner that is asynchronous with respect to the AC signal 201.

In FIG. 3, the transformation point detection signal 301 is the point at which the AC signal 201 rises or falls, this being a pulse that has a width that is larger than the width of the LCD noise 202 that is superimposed on the touch panel signal.

Further explanation will be made with respect to FIG. 3, hereunder.

Figure 9:
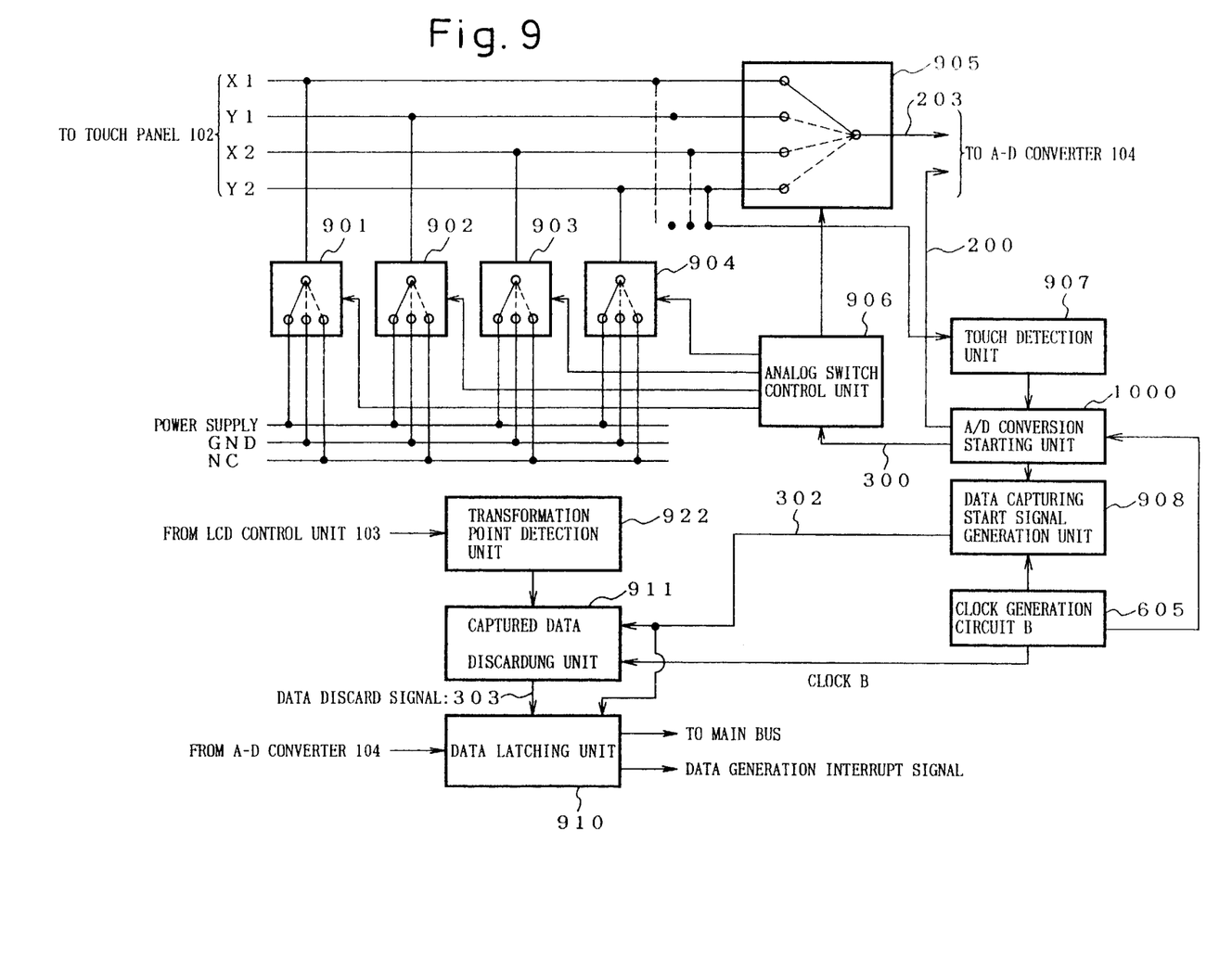
FIG. 9 is a block diagram that shows the configuration of the touch panel interface that is shown in FIG. 1.

First, when a some portion of the touch panel 102 is touched, a touch detecting unit 907 as shown in FIG. 9 but not shown in FIG. 1, generate a touch detection signal 100 is generated and which causes to start an operation of the touch panel interface 105.

After a predetermined period has been passed since the touch detection signal 100 is generated, an analog switch controlling means starting signal 300 is generated to start to detect a value in voltage or current as an analog form representing the position data for a position on which the touch had been conducted and simultaneously with this, an A/D conversion starting signal 200 is also generated from an A/D conversion starting unit 1000, as shown in FIGS. 3 and 9.

With this A/D conversion starting signal 200, the analog voltage data 203 generated from the touch panel 102 is read by the A-D converter 104.

After a predetermined period has passed from the time when the A/D conversion starting signal 200 is generated, a data capturing start signal 302 is generated to capture the digital data which has been converted from such analog data 203 as the positional data.

In the present invention, when the transformation point detection signal 301 is generated overlappingly with data capturing start signal 302, the digital data as generated from the A-D converter 104 is cancelled and not to be captured to be displayed at the display means by generating the data discard signal 303 since this digital data includes the above-mentioned noise and is seemed to be an incorrect data.

In the present invention, the data discard signal 303 can be generated either when the above-mentioned both signals are overall overlapped or when at least a part of both signals are partially overlapped to each other.

Figure 7:
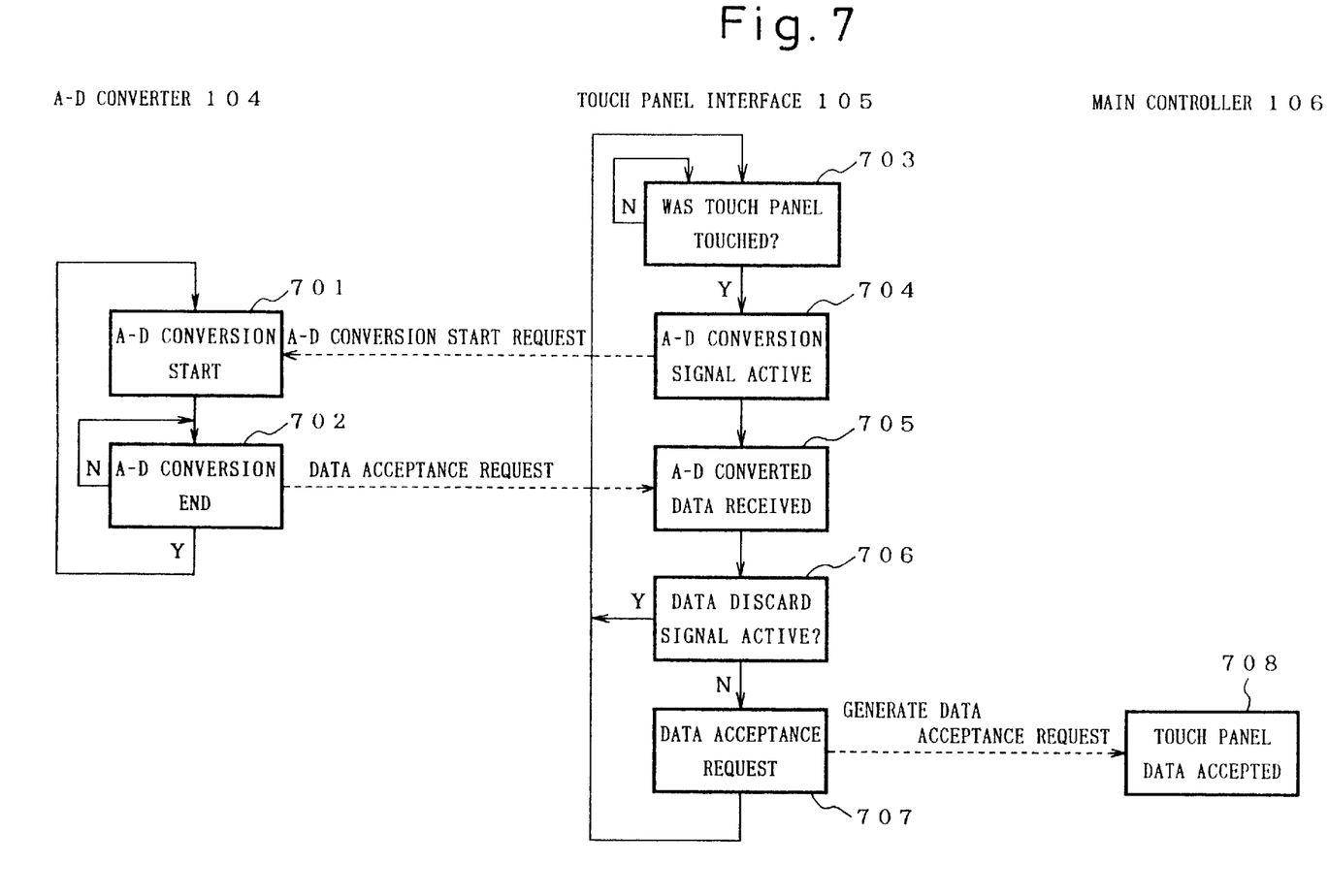
FIG. 7 is a flowchart that illustrates the sequence of capturing touch panel data.

FIG. 7 shows the flow of the operations required to discard analog data of the touch panel 102 which includes an error caused by the LCD noise 202, and send digital data that has no error caused by the LCD noise 202 to the main controller 106.

In FIG. 7, step 701 shows the step of starting the A-D conversion of a touch panel signal by the A-D converter 104, in response to a start signal from the touch panel interface 105.

At step 702, the sampling of the touch panel signal is completed by the A-D converter 104, this completing the A-D conversion.

At step 703, the operation of sensing by the touch panel interface is performed to detect, by means of a change in the resistance value of the touch panel 102, whether or not the touch panel 102 has been touched.

Step 704 indicates that the A-D conversion signal is valid, at which point the detection of the touch panel 102 being touched is made, and the A-D conversion start request signal is output to the A-D converter 104.

At step 705, the touch panel interface 105 receives A-D converted data and in this step, the A-D converted data is received by the touch panel interface 105 that indicates that the A-D conversion at the A-D converter 104 is completed, and the interface receives A-D converted data for the touch panel from the A-D converter 104.

At step 706, a check is made by the touch panel interface as to whether or not the data discard signal 303 is active.

Figure 6:
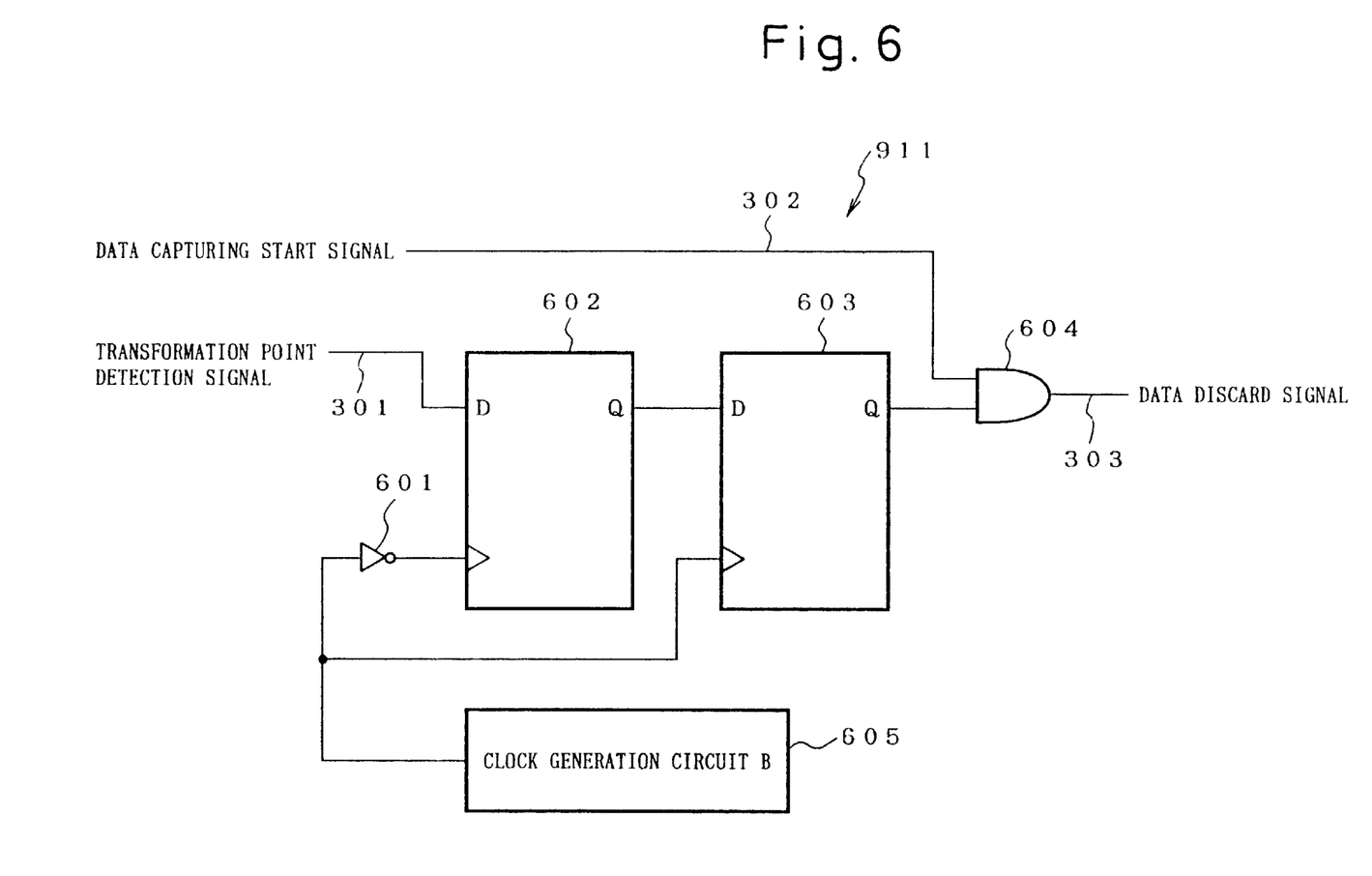
FIG. 6 is a circuit diagram that shows the configuration of a data discard signal generation circuit.

The dada discard signal 303 is generated by the signal generation circuit that is shown in FIG. 6 which is included within the touch panel interface 105.

At step 706, a test is made as to whether the data discard signal 303 is inactive and also the A-D conversion is completed.

If the data discard signal 303 is active, the touch panel interface 105 does not capture the data and return is made to step 703.

If the data discard signal 303 is inactive and also the A-D conversion has been completed, the touch panel interface 105 captures the data and control jumps proceeds to step 707.

At step 707, a request for passage of data is made. At this step, the touch panel interface makes a request with respect to the main controller 106 to pass the touch panel signal.

Step 708 is a step at which the touch panel signal is received, and at this step the main controller 106 receives the touch panel signal from the touch panel interface 105.

An embodiment of the present invention is described below, with reference being made to FIG. 4, FIG. 6, FIG. 8, and FIG. 9.

Figure 8:
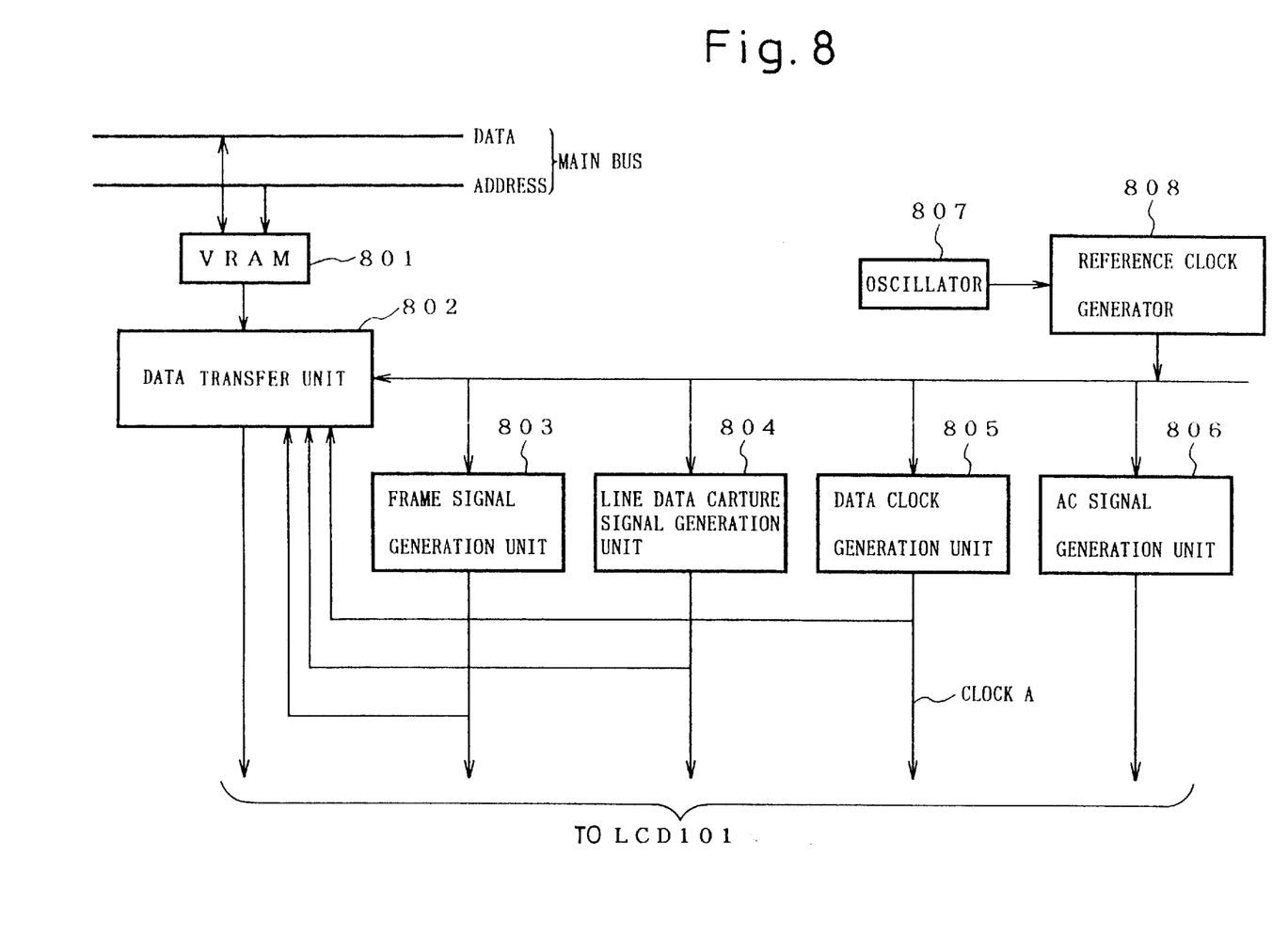
FIG. 8 is a block diagram that shows the configuration of the LCD control unit that is shown in FIG. 1.

Referring first to FIG. 8, which shows the internal configuration of the LCD control unit 103, this unit is formed by a VRAM (video random access memory) 801, a data transfer unit 802 for transferring from the VRAM 801 to the LCD 101, a frame signal generation unit 803, a line data capture signal generation unit 804, a data clock generation unit 805, an AC signal generation unit 806, an oscillator 807, and a reference clock generation circuit 808.

The VRAM 801 is connected to the main bus (not shown in the drawing), to which the main controller 106 is connected.

The VRAM 801 has written into it image data generated by the main controller 106 for writing into the LCD 101.

The data transfer unit 802 is provided so as to output image data for the LCD 101 which is written into the VRAM 801, so as to be suitable for the LCD 101 interface.

The frame signal generation unit 803 generates a signal that indicates the start of the capture of data for one frame of image data for the LCD 101.

The line data capture signal generation unit 804 generates a signal for the purpose of performing capture of one line of image data for the LCD 101.

The data clock generation unit 805 generates a signal for the purpose of capturing LCD 101 pixel data.

The AC signal generation unit 806 generates a signal for the purpose of limiting the deterioration of the liquid crystal element of the LCD 101, this unit generating an AC signal 201 that repeatedly alternates between a high level and a low level at a prescribed period.

The timing of the repeated high level and low level of the AC signal 201 is synchronized to the frame signal.

Although the oscillator 807 assumes a quartz oscillator, any type of oscillator that can generate a frequency capable of producing a clock for capturing LCD 101 pixel data can be used.

The reference clock generation circuit 808 uses the clock from the oscillator 807 to generate a reference clock, which is use for the operation of the data transfer unit 802, the frame signal generation unit 803, the line data capture signal generation unit 804, the data clock generation unit 805, and the AC signal generation unit 806.

The signals generated by the data transfer unit 802, the frame signal generation unit 803, the line data capture signal generation unit 804, the data clock generation unit 805, and the AC signal generation unit 806 are all supplied to the LCD 101.

With regard to the VRAM 801, in the LCD control unit 103 of this embodiment, this is implemented as an image memory that is separate from the memory 107.

However, it is also possible to use part of the memory 107 as the VRAM 801, in which case DMA (direct memory access) is used, and when LCD 101 data is transferred to the LCD control unit 103, access to the memory 107 of the main controller 106 is limited, during which time data is transferred.

Referring now to FIG. 9, which shows a block diagram of the internal configuration of the touch panel interface 105.

This interface 105 includes an analog switch 901, and analog switch 902, an analog switch 903, and analog switch 904, an analog switch 905, an analog switch control unit 906, a touch detection unit 907, a data capture start signal generation unit 908, and a clock generation circuit 605, which generate a second clock B.

The touch panel interface 105 includes a circuit for passing analog data of the touch panel 102 to the A-D converter 104, a data latching unit 910 for the A-D converter 104, a transformation point detection unit 922, a captured data discarding unit 911, and a circuit for passing digital data from the A-D converter 104 to the main controller 106.

The touch panel interface 105 further includes an A/D conversion starting signal generation means 1000 which is controlled by the touch detection unit 907 and controls the data capture start signal generation unit 908.

The A/D conversion starting signal generation means 1000 generates an A/D conversion starting signal 200 to the A-D converter 104 and also generates an analog switch controlling signal 300 to the analog switch control unit 906.

On the other hand, the captured data discarding unit 911 also controlled by the data capturing start signal 302 generated by the data capture start signal generation unit 908 and the clock B generated by the clock B generating means 605.

The analog switches 901 through 904 are provided so as to switch the connections to a plurality of terminals of the touch panel 102 when analog data is captured from the touch panel.

The analog switch 905 is provided for the purpose of selectively coupling a specific terminal of a plurality of terminals of the touch panel 102 to the A-D converter 14 when passing analog coordinate data from the touch panel 102 to the A-D converter 104.

The analog switch control unit 906 generates a signal for the purpose of switching the connection path between analog switches 901 through 905, and this analog switch control unit 906 outputs a signal that serves to mask the touch detection signal of the touch detection unit 907.

The touch detection unit 907 is provided for the purpose of determining whether or not the touch panel 102 has been touched, and this unit activates the touch detection signal when the touching of the touch panel 102 is detected.

That is, the touch detection unit 907 is connected to one of the plurality of terminals of the touch panel 102, and when the signal at that terminal becomes active, makes the judgment that the touch panel 102 has been touched and, in response, activates the touch detection signal.

A signal of the analog switch control unit 906 establishes whether or not to detect the touching of the touch panel 102.

When a signal line that is connected to the touch detection unit 907 from the analog switch control unit 906 becomes active, that is, during the capture of analog data from the touch panel 102, the analog switch control unit 906 masks the touch detection signal so that touch detection is not performed.

The A/D conversion starting signal generation means 1000 generates the A/D conversion starting signal 200 to the A-D converter 104 and the analog switch controlling signal 300 to the analog switch control unit 906.

The analog switch controlling signal 300 is used for establishing the timing of the start of the switching by the analog switch control unit 906.

The data capture start signal generation unit 908 generate the data capture start signal 302, based on the signal generated from the A/D conversion starting signal generation means 1000 after the predetermined period has been passed since the A/D conversion starting signal 200 has been generated.

The A/D conversion starting signal generation means 1000 also uses the output of the clock generation circuit 606 as a reference clock (B) for the purpose of generating the above-noted signal.

The data latching unit 910 is provided for the purpose of converting the touch panel 102 data that is converted to digital data by the A-D converter 104 to a format that can be read by the main controller 106, and this unit converts digital data from the A-D converter 104 into a format having a width that is matched to the bit width of the main bus.

The data latching unit 910 outputs a data generation interrupt signal for the purpose of having the main controller 106 accept data when digital data from the A-D converter 104 is captured. This data generation interrupt signal is masked when the data discard signal 303 is active.

The transformation point detection unit 922 is provided for the purpose of detecting a transformation point in the AC signal 201 that is generated by the LCD control unit 103, and this unit outputs a signal that is required for the captured data discarding unit 911 to generate the data discard signal 303.

The captured data discarding unit 911 is provided for the purpose of outputting the timing for the discarding of data that includes an error that occurs in the touch panel 102 data because of the LCD noise 202 that is generated by the change in the AC signal 201.

Figure 4:
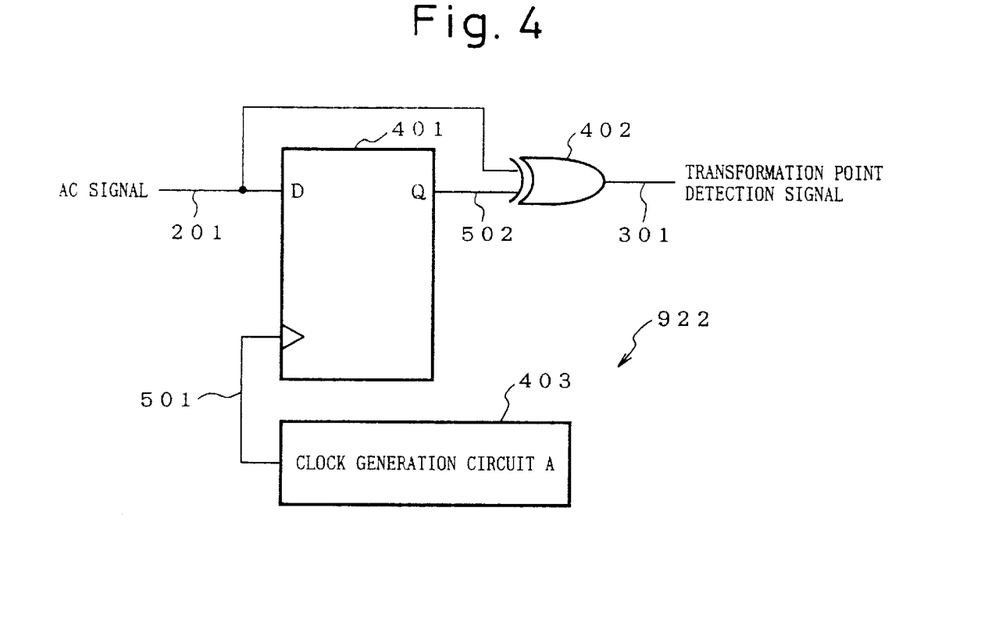
FIG. 4 is a circuit diagram that shows the configuration of a transformation point detection circuit.

FIG. 4 shows an example of a circuit for the purpose of generating the transformation point detection signal 301.

This circuit is formed by a D-type flip-flop 401, an Exclusive-OR (EXOR) circuit 402, and a clock generation circuit 403 for the purpose of establishing the width of the transformation point detection signal 301.

FIG. 6 shows an example of a captured data discard signal generation circuit for the purpose of outputting the data discard signal 303.

This circuit is formed by the NOT (inverter) circuit 601, the D-type flip-flip 602, the D-type flip-flop 603, the AND circuit 604, and the clock generation circuit B 605.

The operation of an embodiment of the present invention is described below. First, referring to FIG. 4, the circuit for the purpose of generating the transformation point detection signal 301, which establishes the timing of the discarding of data that includes noise from the touch panel will be described.

The transformation point detection signal 301 is generated using the clock (A) from the clock generation circuit 403, in synchronization with the AC signal 201. That is, the AC signal 201 is delayed by the D-type flip-flop 401 by an amount that is one clock of the clock generation circuit A 403.

Then, exclusive-OR of the AC signal 201 and the 1-clock-delayed AC signal is taken by the EXOR circuit 402 so as to generate the transformation point detection signal 301.

The clock (A) of the clock generation circuit 403 that is used in the above operation is taken as a clock having a period that it is the length of the touch panel 102 noise.

Figure 5:
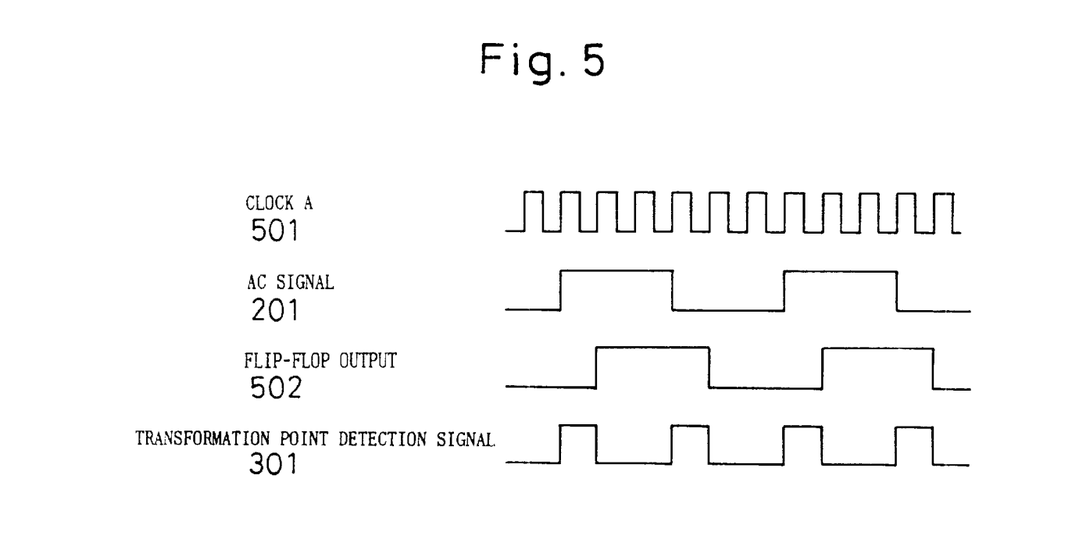
FIG. 5 is a waveform diagram that shows the various signals in the circuit that is shown in FIG. 4.

By doing this, the waveform of the transformation point detection signal that is generated is as shown in FIG. 5. The flip-flop output 502 corresponds to the Q output of the D-type flip-flop 401.

FIG. 3 is a waveform diagram that shows the timing of the data discard signal 303 for discarding data that includes noise from the touch panel 102 and the data capturing start signal 302.

The data discard signal shown in FIG. 3 is generated by the captured data discard signal generation circuit that is shown in FIG. 6.

This data discard signal 303 is produced by taking the AND of the transformation point detection signal 301 and the data capturing start signal 302.

In terms of circuitry, in order to avoid metastability, after the transformation point detection signal is synchronized to a clock that is synchronized to the data capturing start signal 302, that is, to the clock (B) of the clock generation circuit 605, the AND is taken by using the AND circuit 604.

By doing this, the data discard signal 303 such as shown in FIG. 6 is generated. The captured data discard signal generation circuit shown in FIG. 6 is a circuit provided to perform this operation.

These circuits, shown in FIG. 4 and FIG. 6, are the circuit configurations of the transformation point detection unit 922 and the captured data discarding unit 911 that are part of the touch panel interface 105 shown in FIG. 1.

The operation for the purpose of capturing the coordinate data from the touch panel 102 by the main controller 106 is as follows.

When the touch panel interface 105 detects via the touch detection unit 907 that the touch panel 102 has been touched, the A/D conversion starting signal generation means 1000 generates to the A-D converter 104 a command 200 to start the A/D conversion operation in the A-D converter 104 and also generates the analog switch controlling means starting signal 300 to the analog switch control unit 906 to start to switch the analog switches 901 through 905 so as to capture the analog data from the touch panel 102.

Thereafter, the data capturing start signal generation unit 908 outputs the data capturing start signal 302 to the captured data discarding unit 911.

The method of setting is that in which, when capturing X-axis data of the touch panel 102, one of the Y-axis direction terminals is connected to a power supply, the other being connected to ground, and the X-axis terminal is left in the open condition.

In this condition, the analog switch control unit 906 sets the analog switch 905 so that one of the X1 and X2 X-axis direction terminals is connected to the A-D converter 104.

When the A-D converter 104 detects the data capturing start signal 302, it captures analog data of the touch panel 102 via the analog switch 905.

Once the analog data is captured by the touch panel interface 105, a data passing request is issued to the main controller 106 by the data latching unit 910, that is, it generates the data generation interrupt signal 303. At this point, if the data discard signal 303 from the captured data discarding unit 911 is detected, the generation of the data generation interrupt signal with respect to the main controller 106 is inhibited.

By doing this, data from the touch panel 102 that includes an error caused by noise is discarded, so that data from the touch panel 101 that includes an error is not captured into the main controller 106, thereby making it possible to send coordinate data that does not include a noise-caused error.

Next, the second embodiment of the present invention will be described, with reference being made to FIG. 10.

This second embodiment is basically the same as the embodiment that is shown in FIG. 1, with the difference being that, in the second embodiment, the interface unit for the purpose of passing analog data of the touch panel 102 to the main controller 106 is changed to a touch panel data processing unit 1001 that includes a built-in A-D converter, other aspects being the same as shown in the embodiment of FIG. 1.

That is, the touch panel data processing unit 1001 is a unit that is formed by a CPU with a built-in A-D converter.

The touch panel data processing unit 1001 processes, by means of a program, the analog data of the touch panel 102 that is captured by its built-in A-D converter.

The touch panel data processing unit 1001, by performing this processing, converts the coordinate data from the touch panel 102 for the purpose of passing the data to the main controller 106 to digital data and stores this converted data.

When the capturing of coordinate data is completed, an interrupt request is generated with respect to the main controller 106, and a request is made to accept the coordinate data from the touch panel 102.

With the exception of the above-noted processing, the touch panel data processing unit 1001 is configured in the same way as the touch panel interface 105 that is shown in FIG. 9, and the captured data discarding unit 911 and the transformation point detection unit 922 each have the configurations as shown in FIG. 6 and FIG. 4, respectively.

In FIG. 1, depending upon the configuration of the LCD 101, there are cases in which the AC signal is actually generated within the internally circuitry of the LCD 101, so that there is no need to input an AC signal from the outside.

In this case as well, however, the LCD 101 uses the frame signal, which is one of the LCD control signals from the LCD control unit 103 to generate the AC signal, as would be done if the signal were generated externally to the LCD 101.

Figure 11:
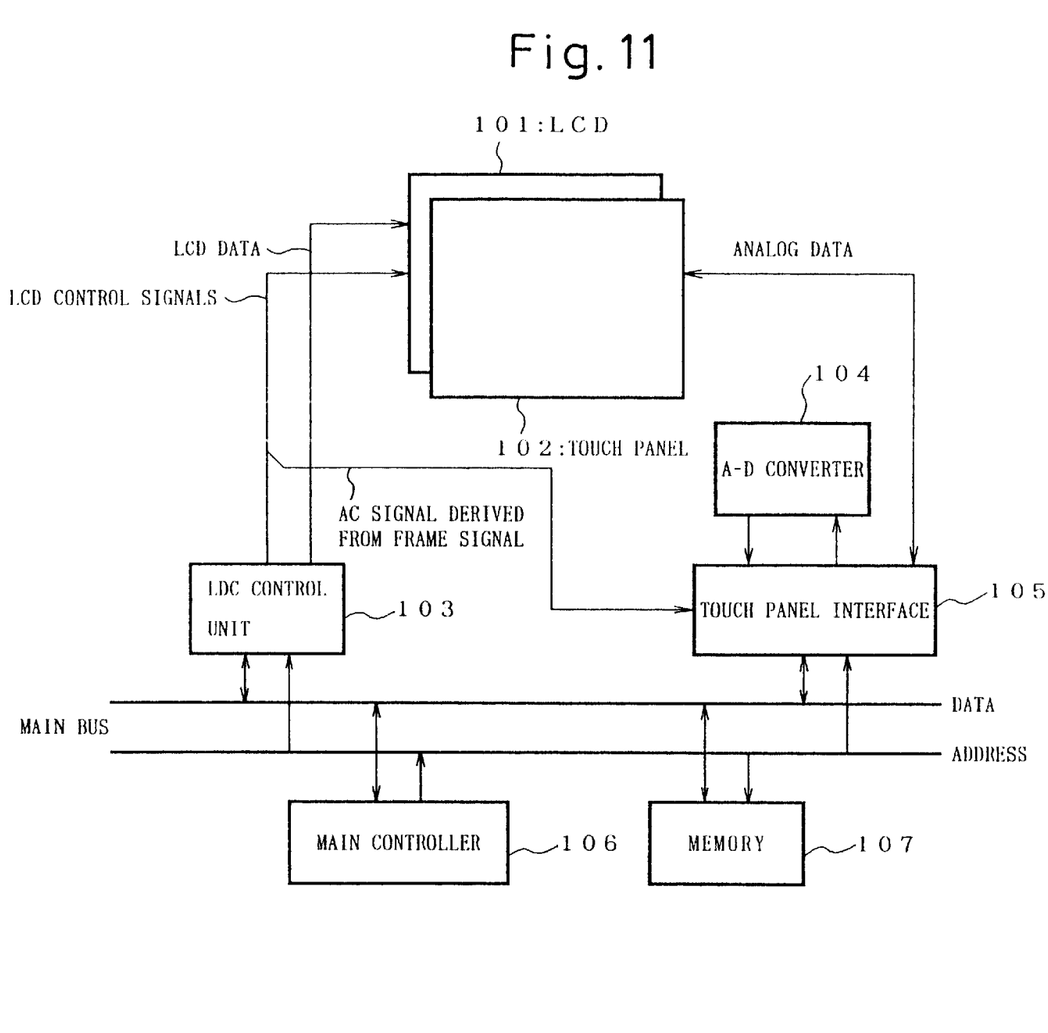
FIG. 11 is a block diagram that shows the configuration of a variation of the first embodiment of the present invention.

Because of this, as can be seen in FIG. 11, in the touch panel interface 105 it is possible to use the frame signal from the LCD control unit 103 rather than the AC signal to generate the data discard signal.

That is, as shown in FIG. 11, the frame signal, which is one of the LCD control signal, is connected to the touch panel interface 105.

In this case, the transformation point detection unit 922 that is shown in FIG. 4 receives the frame signal instead of the AC signal 201. The captured data discarding unit can be the same as that shown in FIG. 6.

Figure 10:
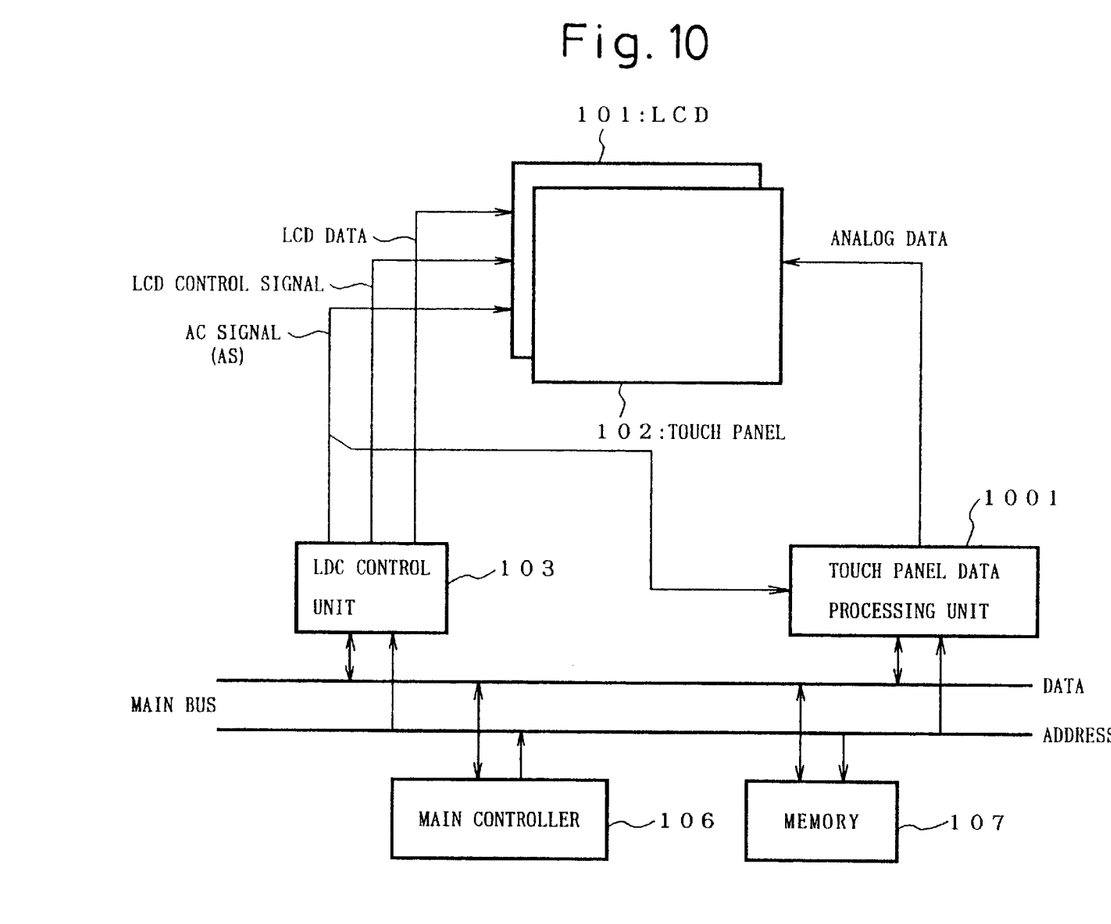
FIG. 10 is a block diagram that shows the configuration of a liquid crystal display apparatus to which the second embodiment of the present invention is applied.

It is obvious that this embodiment can be applied to the liquid crystal display apparatus that is shown in FIG. 10 as well.

Therefore, note that in FIG. 10, the AC signal (AS) may include an AC signal derived from the frame signal.

The first effect of the present invention is that data occurring at times when the AC signal transformation point and the data capturing timing overlap is discarded, so that data that includes an error caused by LCD 101 noise is not passed to the main controller 106, which serves to convert this data to LCD coordinate data.

By doing this, it is possible to avoid the influence of LCD noise on touch panel coordinate data.

The reason for this is that, because the LCD noise that affects the data captured from the touch panel is generated at the transformation point of the LCD AC signal, this data is reliably taken as having an error that is caused by this noise.

By discarding this noise-affected data and not passing this data, which includes an error, to the main controller, it is possible to achieve an effect that is substantially the same as if there were no noise.

The second effect of the present invention is that, compared with the method of capturing touch panel data in synchronization with the timing of the change in the AC signal, because there is no need to implement the troublesome process of establishing timing by resetting a counter at the AC signal transformation point and starting the capture of data a prescribed amount of time thereafter, it is possible to achieve a simplification of the timing generation circuit.

Additionally, it is possible to set the timing of the capture of touch panel data independently from the timing of the AC signal.

The reason for this is that, because the present invention adopts the approach of discarding captured data when it occurs at the transformation point of the AC signal, there is no need to, for example, wait for the transformation point of the AC signal.

What is claimed is:

1. A liquid crystal display apparatus, comprising:
   an LCD as a display means;
   an LCD control unit for controlling a display of said LCD;
   a main controller for displaying required graphic data and character data on said LCD via the LCD control unit;
   an analog-type touch panel as an input means;
   an A-D converter that converts touch panel analog data to digital data;
   a touch panel interface for establishing an interface between said main controller and said A-D converter, and in said display apparatus, information for a position on a screen being determined from said analog data of said touch panel, and said position information being displayed on said LCD, or used to detect a data input position corresponding to a position on said LCD screen, and wherein said display apparatus is further provided with a data-cancellation means for inhibiting the capture of digital data from said A-D converter at the occurrence of noise that is generated as a result of a control signal that is supplied to said LCD from said LCD control unit;
   wherein said data-cancellation means is located separately from the main controller and comprises:
      a transformation point detection unit for detecting a transformation point of said AC signal of said control signals and outputting a transformation point detection signal;
      a data capturing start signal generating unit for generating a data capturing start signal that establishes the timing of the capture of digital data from said A-D converter; and
      a captured data discarding unit that, upon receipt of said transformation point detection signal and said data capturing start signal, if at least a part of each of said transformation point signal and said data capturing start signal overlap, generates a data discard signal.

2. A liquid crystal display apparatus according to claim 1, wherein said data-cancellation means is provided in said touch panel interface, and wherein said touch panel interface discards digital data that was captured from said A-D converter at a time when said data discard signal is generated.

3. A liquid crystal display apparatus according to claim 2, wherein said transformation point detection unit comprises:
   a first clock generation circuit for the purpose of generating a first clock that is synchronized to said AC signal;
   a D-type flip-flop for the purpose of delaying said AC signal by one clock, using said first clock; and
   an exclusive-OR circuit which takes the exclusive-OR of said AC signal and said AC signal delayed by one clock and outputting said exclusive-OR as a transformation point detection signal.

4. A liquid crystal display apparatus according to claim 2, wherein said captured data discarding unit comprises:
   a second clock generation circuit for the purpose of generating a second clock;
   an inverter circuit for the purpose of inverting said second clock;
   a first D-type flip-flop for the purpose of receiving said second clock at a clock terminal and receiving said AC signal at a D input terminal;
   a second D-type flip-flop for the purpose of receiving said second clock at a clock terminal and receiving a Q output of said first D-type flip-flop at a D input terminal; and
   a logical AND circuit that takes the AND of said data capturing start signal and a Q output of said second D-type flip-flop and outputs this as a data discard signal.

5. A liquid crystal display apparatus according to claim 1, wherein said LCD has a function of generating an AC signal by a frame signal of said control signals, and wherein said data-cancellation means comprises:
   a transformation point detection unit for the purpose of detecting a transformation point of said frame signal and outputting a transformation point detection signal;
   a data capturing start signal generation units that generates a data capturing start signal that establishes the timing of the capture of digital data from said A-D converter; and
   a captured data discarding unit that, upon receipt of said transformation point detection signal and said data capturing start signal, if at least a part of said each of signals is temporally overlap to each other, generates a data discard signal.

6. A liquid crystal display apparatus, comprising:

an LCD as a display means;

an LCD control unit for controlling a display of said LCD;

a main controller for displaying required graphic data and character data on said LCD via the LCD control unit;

an analog-type touch panel as an input means;

a touch panel interface, which internally includes an A-D converter that converts touch panel analog data to digital data, for establishing an interface between said main controller and said touch panel, and in said display apparatus, information for a position on a screen being determined from said analog data of said touch panel, and said position information being displayed on said LCD, or used to establish a correspondence to an input position on said LCD screen;

a data-cancellation means for inhibiting the capture of digital data from said A-D converter at the occurrence of noise that is generated as a result of a control signal that is supplied to said LCD from said LCD control unit:

wherein said data-cancellation means is located separately from the main controller and comprises:

a transformation point detection unit for detecting a transformation point of said AC signal of said control signals and outputting a transformation point detection signal;

a data capturing start signal generation unit for generating a data capturing start signal that establishes the timing of the capture of digital data from said A-D converter; and a captured data discarding unit that. upon receipt of said transformation point detection signal and said data capturing start signal, if at least a part of each of said transformation point detection signal and said data capturing start signal overlap, generates a data discard signal.

7. A liquid crystal display apparatus according to claim 6, wherein said data-cancellation means is provided in said touch panel interface, and wherein said touch panel interface discards digital data that was captured from said A-D converter at a time when said data discard signal is generated.

8. A liquid crystal display apparatus according to claim 7, wherein said transformation point detection unit comprises:

a first clock generation circuit for the purpose of generating a first clock that is synchronized to said AC signal;

a D-type flip-flop for the purpose of delaying said AC signal by one clock, using said first clock; and an exclusive-OR circuit which takes the exclusive-OR of said AC signal and said AC signal delayed by one clock and outputting said exclusive-OR as a transformation point detection signal.

9. A liquid crystal display apparatus according to claim 7, wherein said captured data discarding unit comprises:

a second clock generation circuit for the purpose of generating a second clock;

an inverter circuit for the purpose of inverting said second clock;

a first D-type flip-flop for the purpose of receiving said second clock at a clock terminal and receiving said AC signal at a D input terminal;

a second D-type flip-flop for the purpose of receiving said second clock at a clock terminal and receiving a Q output of said first D-type flip-flop at a D input terminal; and a logical AND circuit that takes the AND of said data capturing start signal and a Q output of said second D-type flip-flop and outputs this as a data discard signal.

10. A liquid crystal display apparatus according to claim 6, wherein said LCD has a function of generating an AC signal by means of a frame signal of said control signals, and wherein said data-cancellation means comprises:

a transformation point detection unit for the purpose of detecting a transformation point of said frame signal and outputting a transformation point detection signal;

a data capturing start signal generation units that generates a data capturing start signal that establishes the timing of the capture of digital data from said A-D converter; and a captured data discarding unit that, upon receipt of said transformation point detection signal and said data capturing start signal, if at least a part of said each of signals is temporally overlap to each other, generates a data discard signal.

* * * * *